No. 636,506. Patented Nov. 7, 1899.
W. J. EDWARDS & T. J. GRAY.
DITCHING MACHINE.
(Application filed Apr. 28, 1899.)
(No Model.) 9 Sheets—Sheet 2.
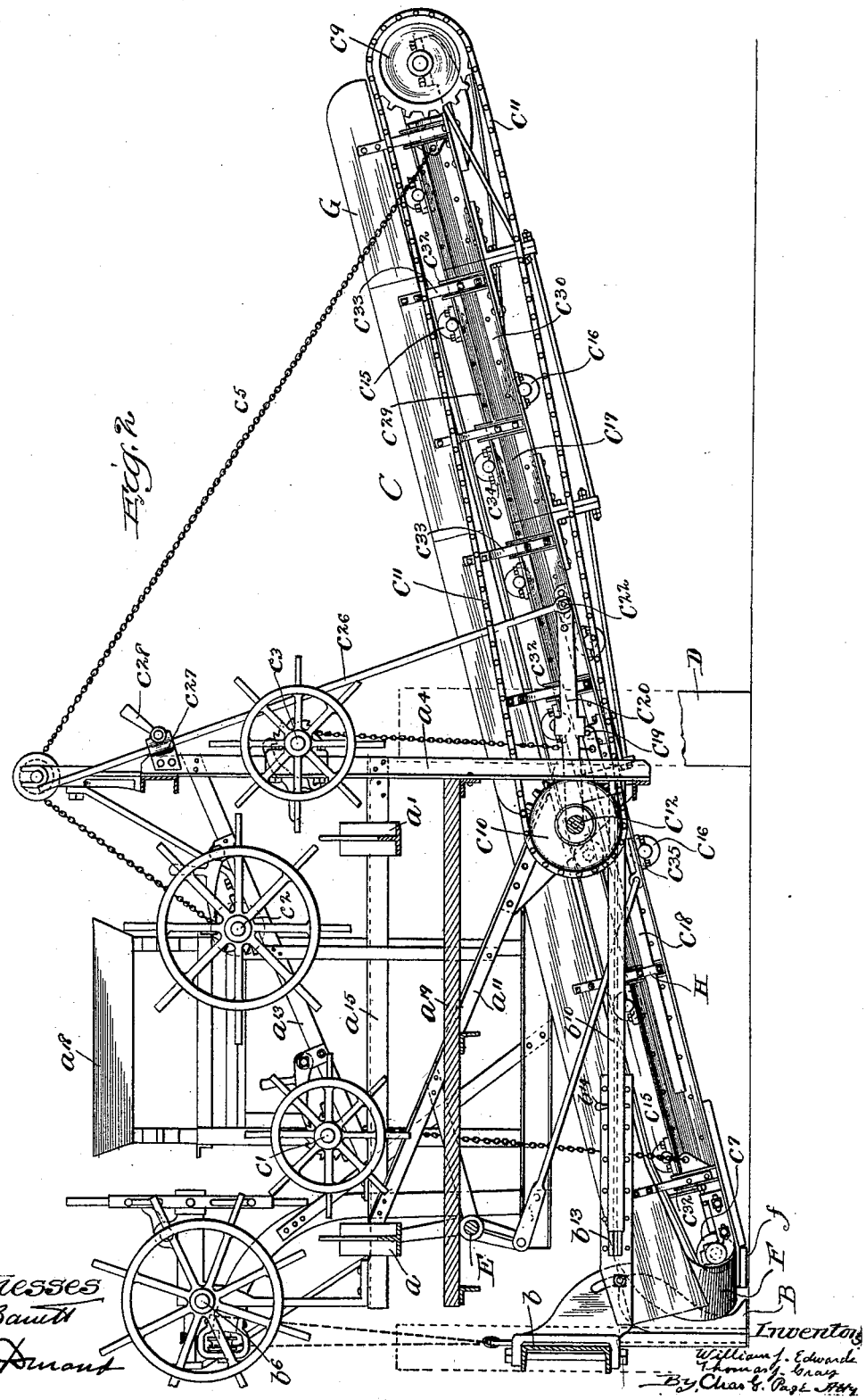

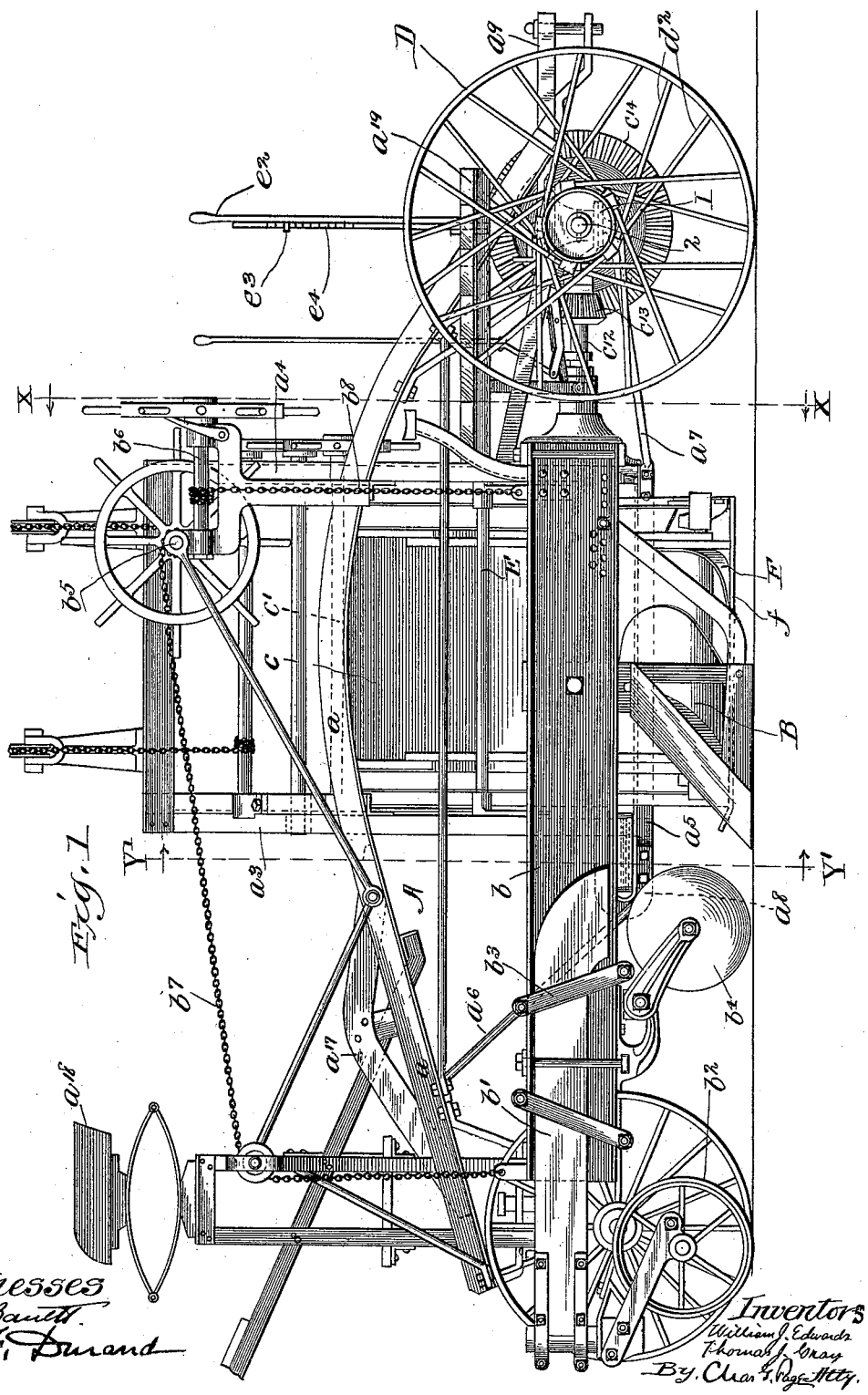

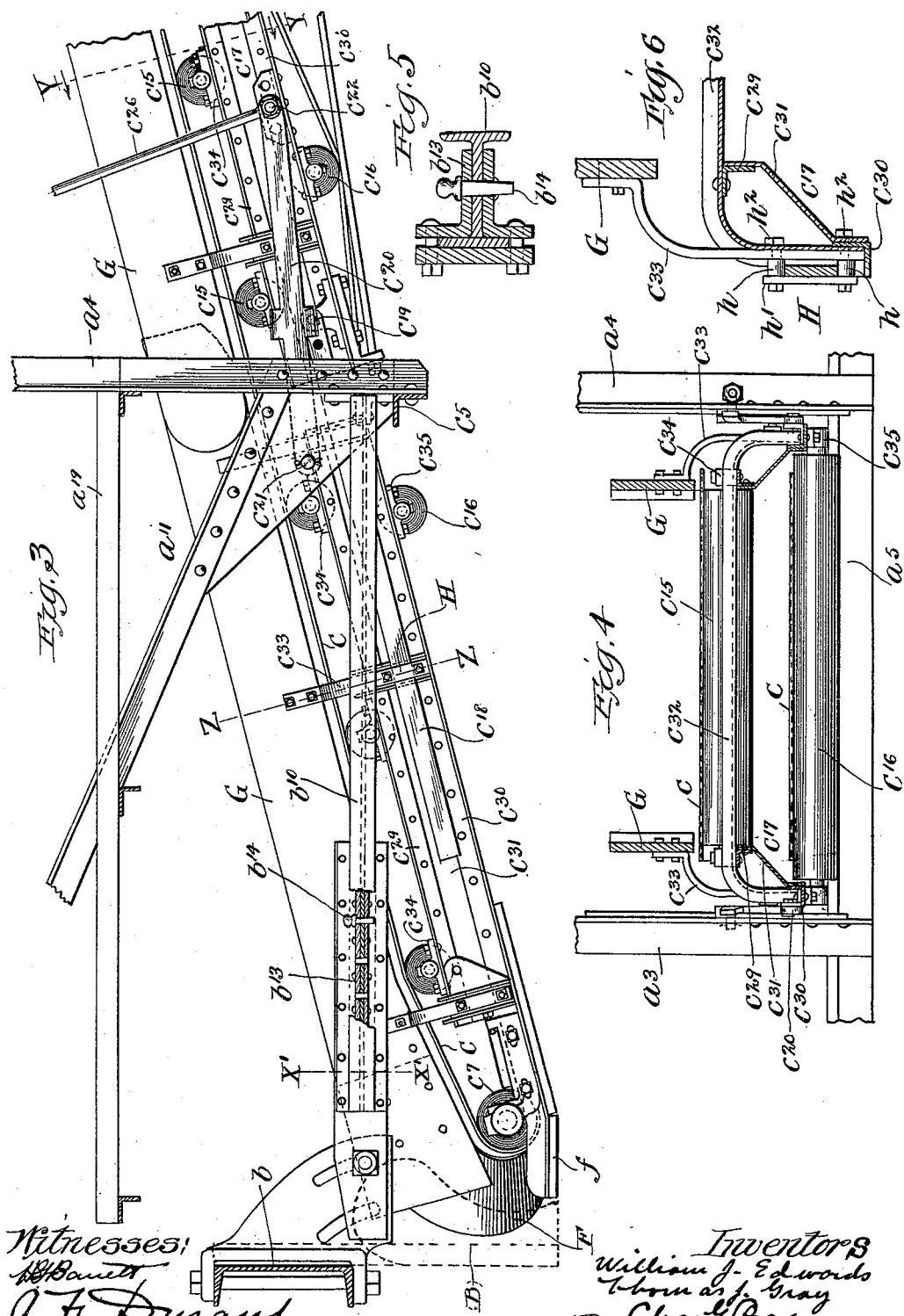

No. 636,506. Patented Nov. 7, 1899.
W. J. EDWARDS & T. J. GRAY.
DITCHING MACHINE.
(Application filed Apr. 28, 1899.)
(No Model.) 9 Sheets—Sheet 4.
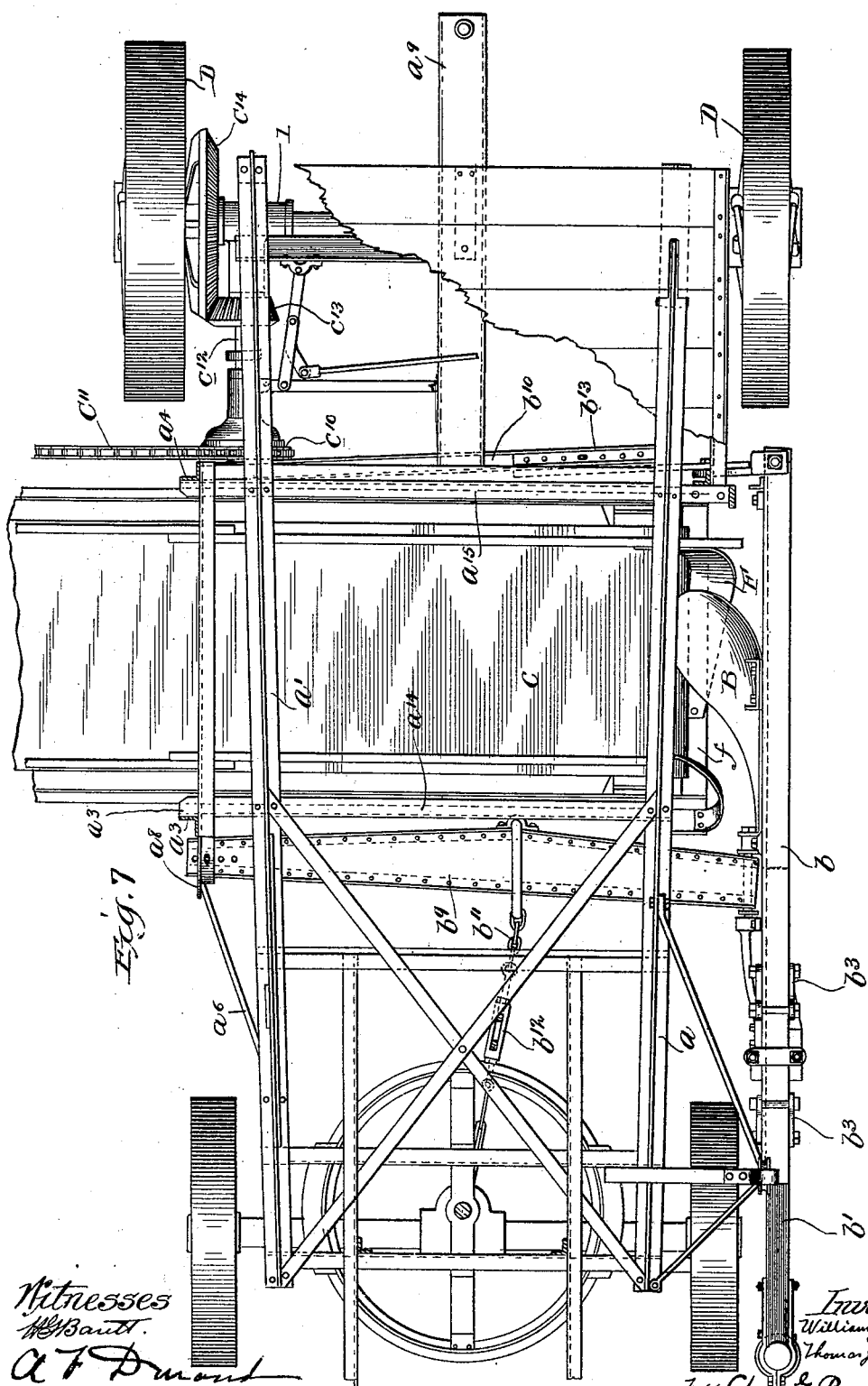

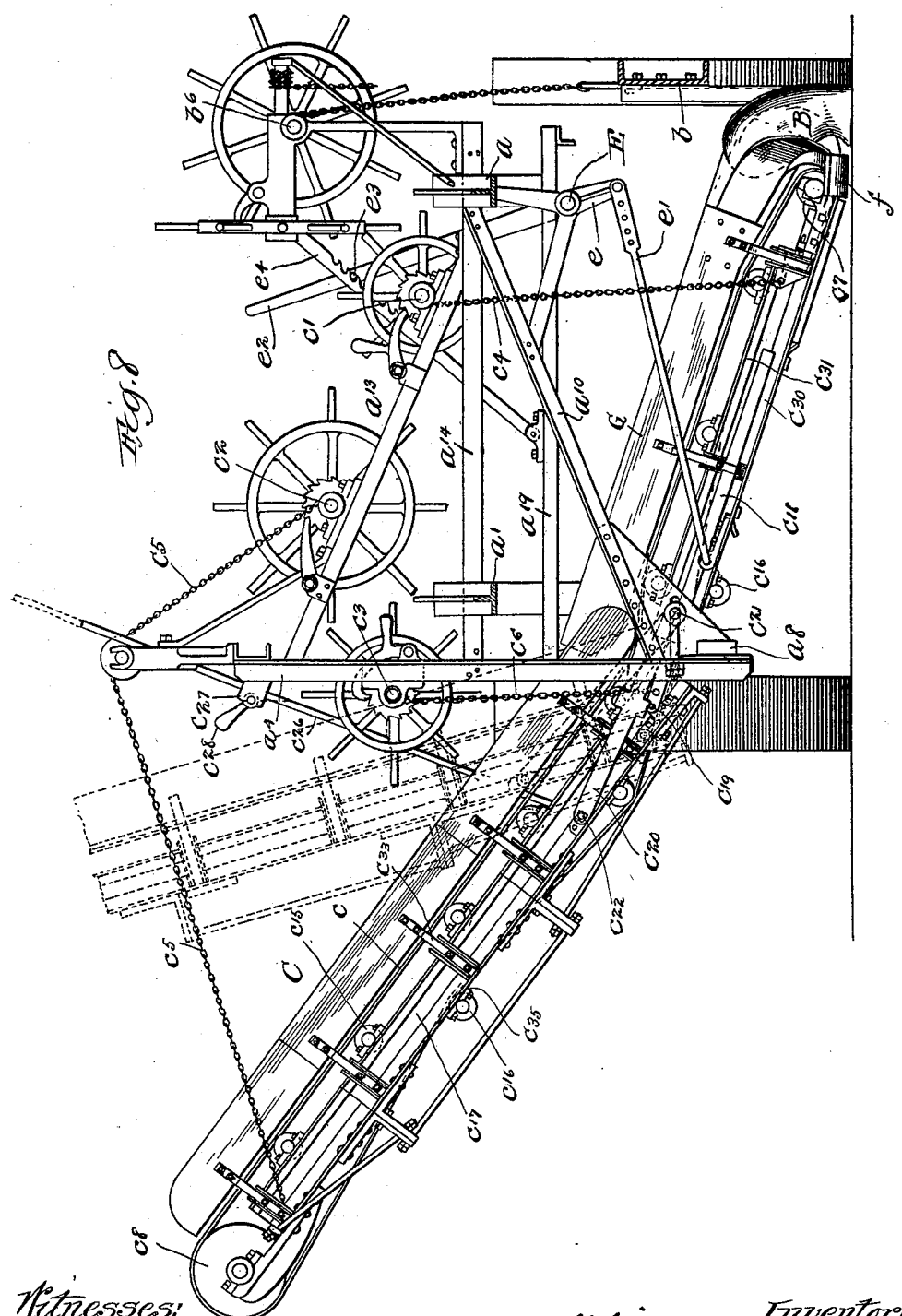

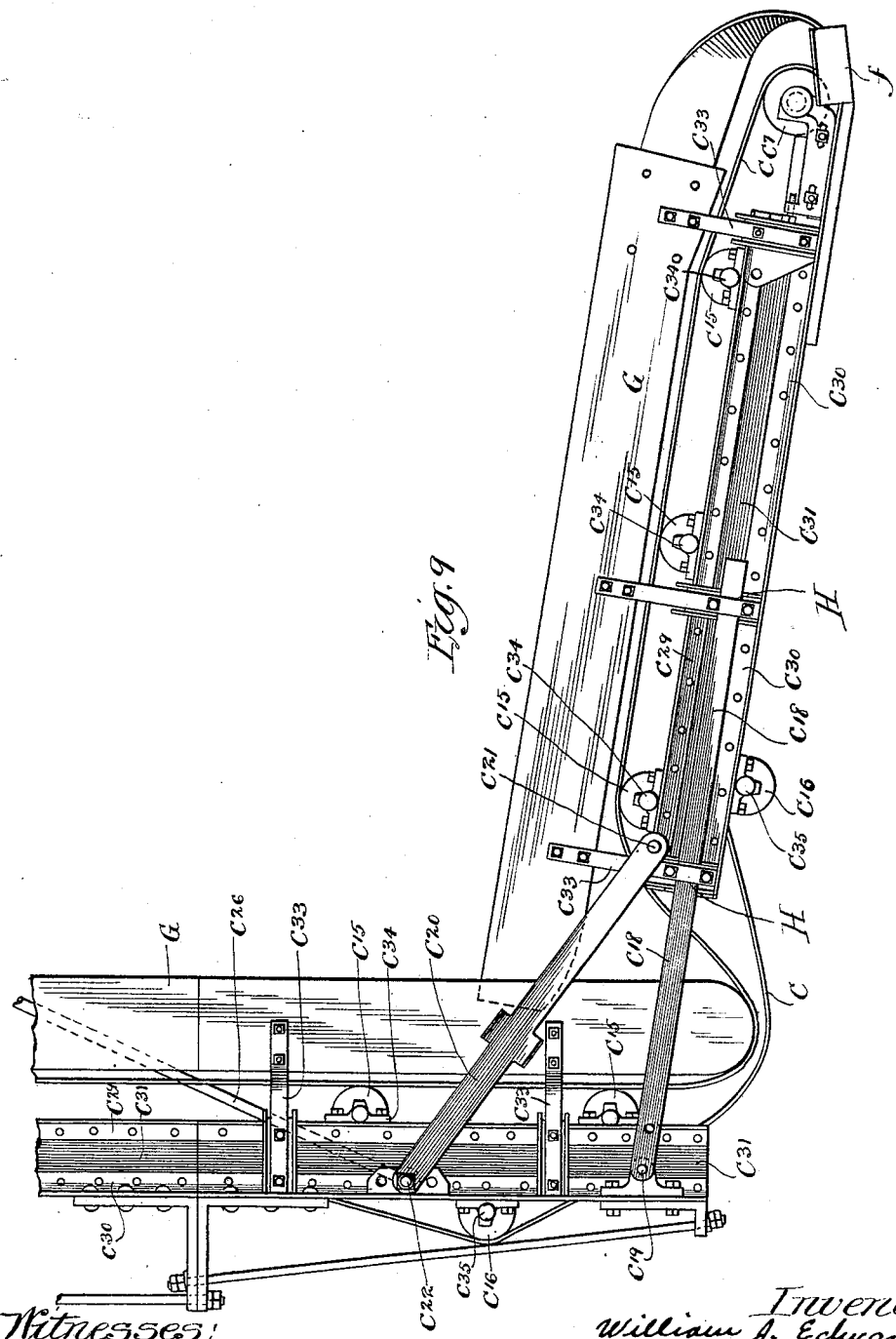

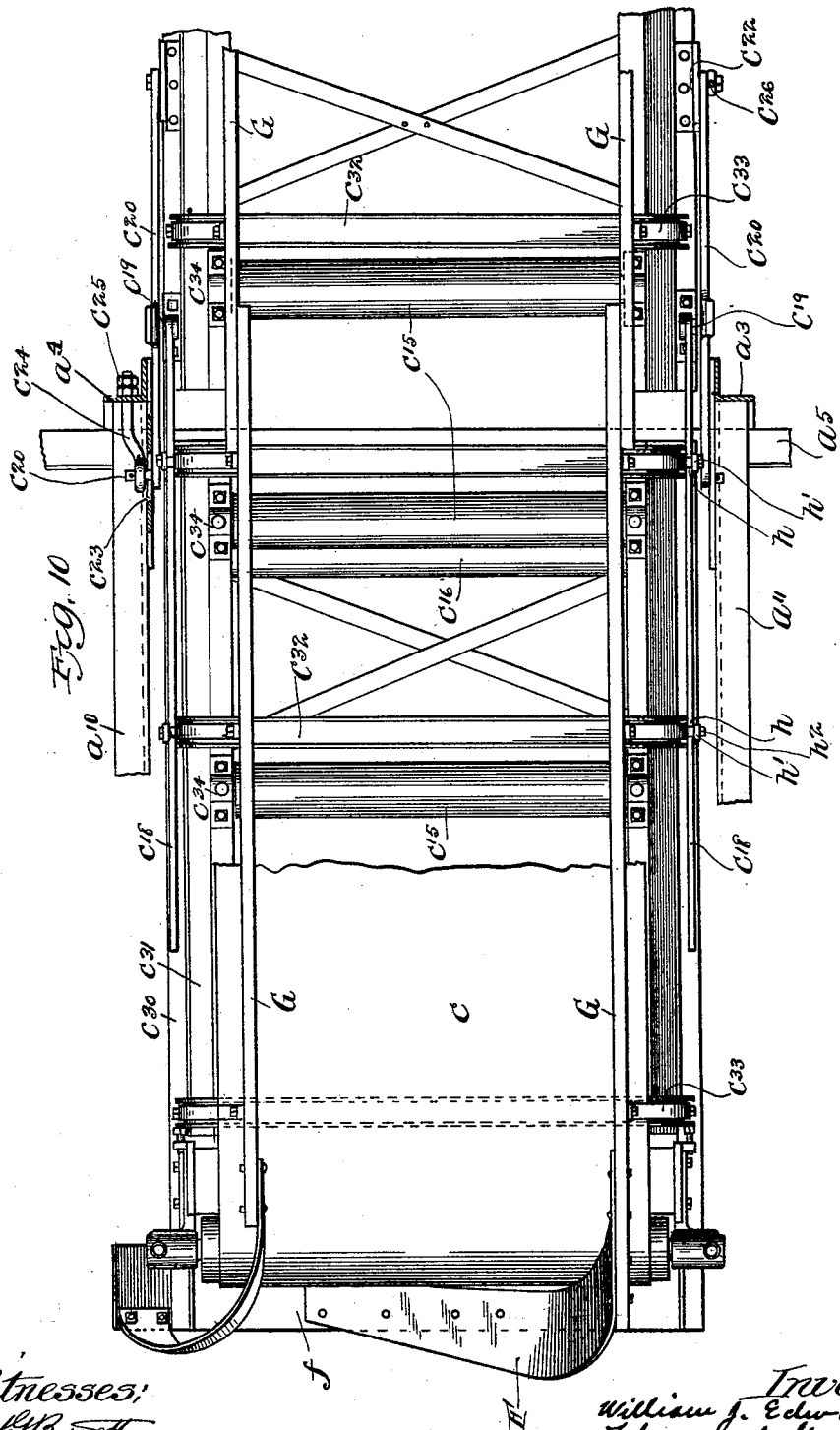

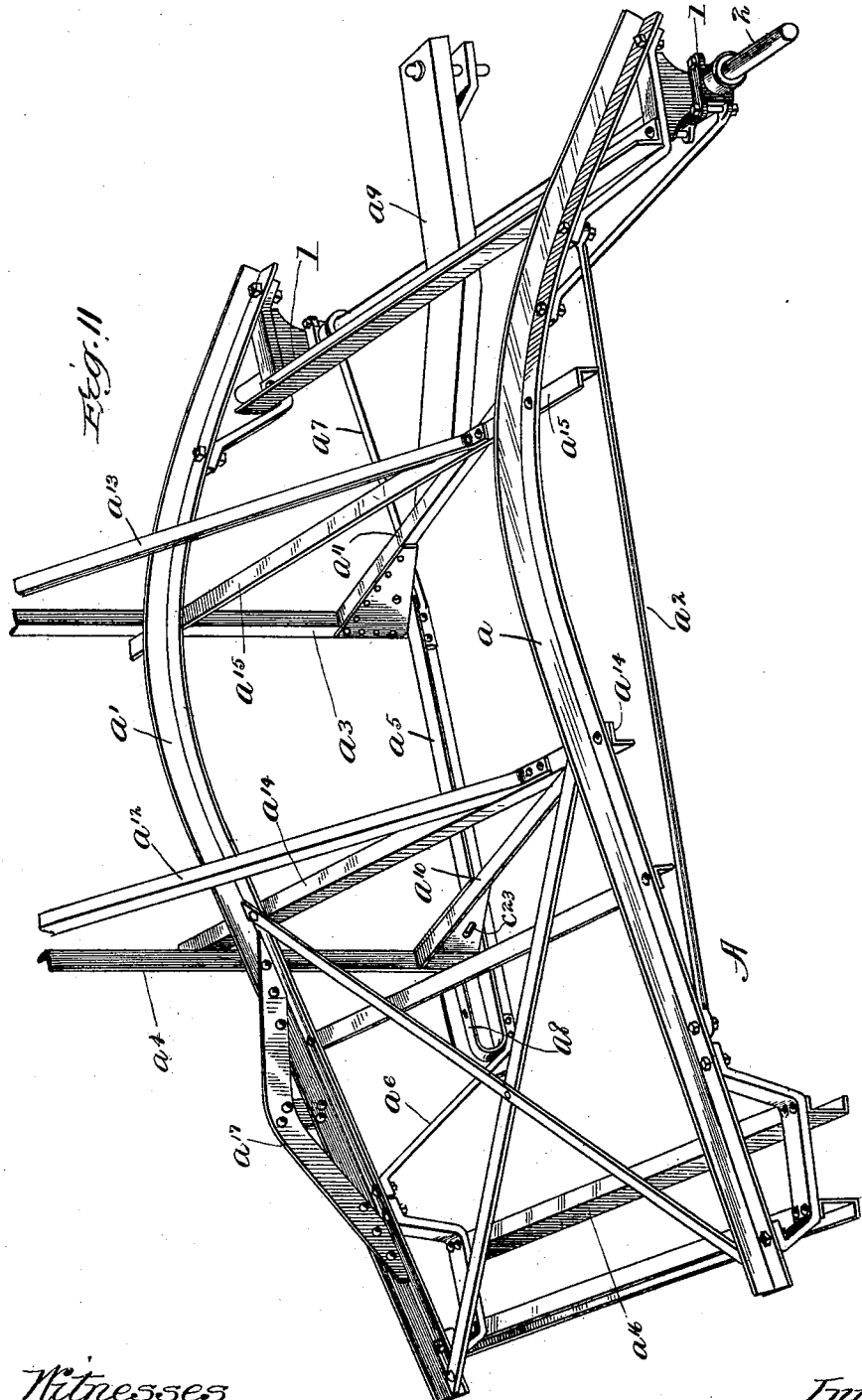

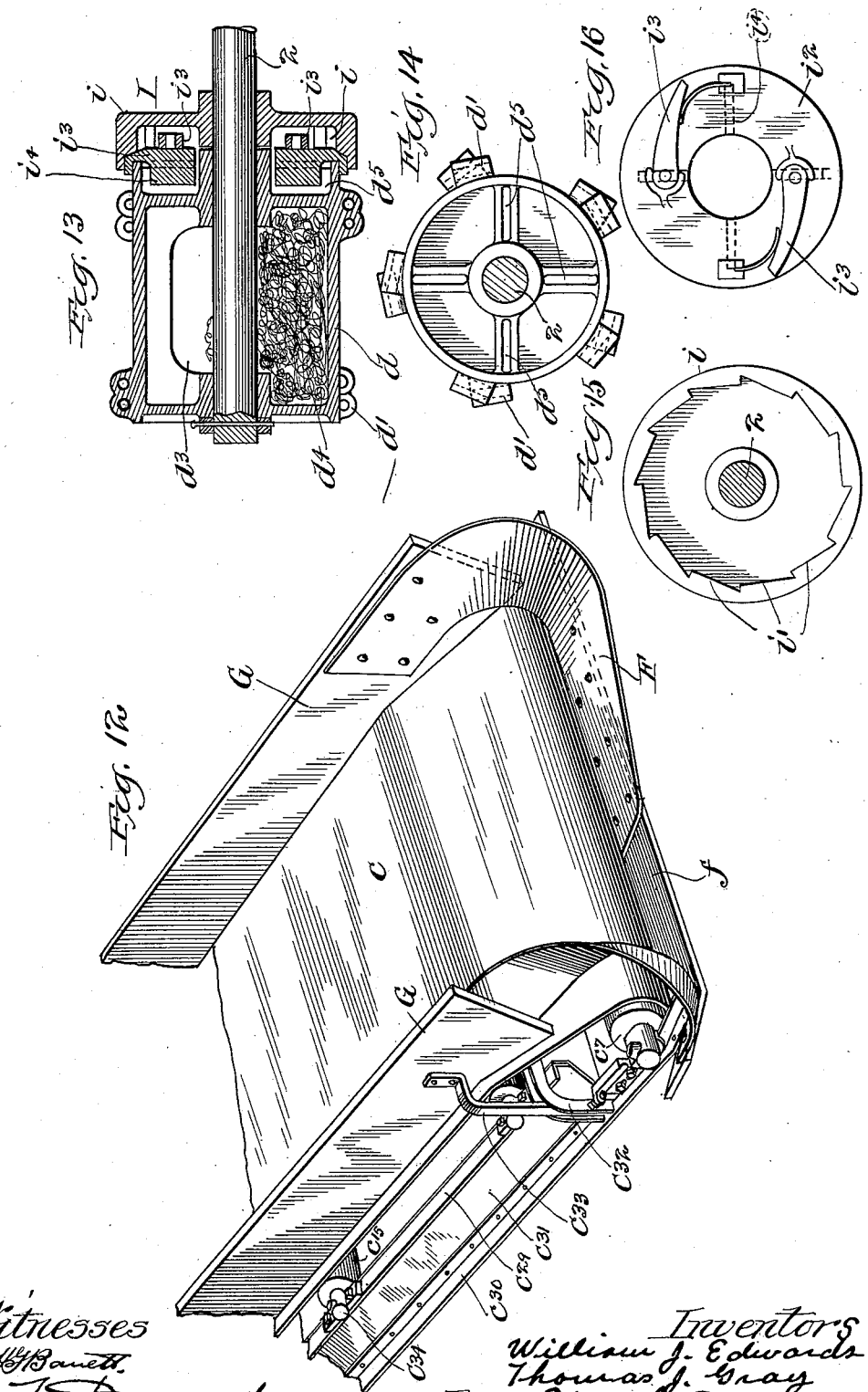

UNITED STATES PATENT OFFICE.

WILLIAM J. EDWARDS AND THOMAS J. GRAY, OF CHICAGO, ILLINOIS, ASSIGNORS TO FREDERICK C. AUSTIN, OF SAME PLACE.

DITCHING-MACHINE.

SPECIFICATION forming part of Letters Patent No. 636,506, dated November 7, 1899.

Application filed April 28, 1899. Serial No. 714,856. (No model.)

*To all whom it may concern:*

Be it known that we, WILLIAM J. EDWARDS and THOMAS J. GRAY, citizens of the United States, residing at Chicago, in the county of Cook and State of Illinois, have invented certain new and useful Improvements in Grading and Ditching Machines, of which the following is a specification.

The particular construction of grading and ditching machine to which our invention relates is shown in Letters Patent of the United States No. 275,614, issued April 10, 1883, it being understood, however, that the different features of our invention may, so far as they are applicable, be employed in connection with various other grading and ditching machines.

The principal objects of our invention are as follows: first, to facilitate the operation of ditching by providing the plow with an extensible or longitudinally-adjustable plow-beam, whereby the machine may be turned around to the left without bringing the draft appliances into collision with the forward portion of the plow-beam; to insure a delivery of the soil from the plow to the conveyer-belt and to guard or protect the belt against contact with the moldboard; to improve the general construction of the driving-wheels and the power-transmitting mechanism between the latter and the elevating-carrier; to improve the general construction of the elevating-carrier and to provide a carrier-frame constructed entirely of iron or steel and combining strength, rigidity, and lightness; to provide a body-frame involving a couple of trusses suitably connected by cross-beams and having their end portions supported or upheld by front and rear vehicle-wheels, and, further, to simplify and improve the general construction of the body-frame with a view to securing a greater degree of strength and rigidity without increasing the weight thereof; to facilitate the operation of adjusting the rear end of the plow laterally and to provide simplified and improved means for so doing; to facilitate the raising and lowering and general adjustment or handling of the elevating-carrier; to permit the carrier to be so adjusted as to allow the machine to pass through a narrow gateway; to provide improved means for swinging or moving the carrier outwardly and away from the plow; to provide an elevating-carrier comprising a couple of frame-sections hinged together by an extensible joint, and to provide an arrangement whereby the outer section may be swung from side to side or adjusted laterally for the purpose of alinement; to provide an elevating-carrier involving a plurality of jointed frame-sections capable of a relative lateral swing for the purpose of alinement; to provide an improved and highly advantageous form of combined pivotal and telescoping joint for the two frame-sections and to improve the method of connecting the outer frame-section with the body-frame; to provide an easily-operated and efficient device for locking the elevating-carrier against upward shift or movement, and to provide certain novel details tending to increase the general efficiency and serviceability of machines of this class.

To the attainment of the foregoing and other useful ends our invention consists in matters hereinafter described and claimed.

In the accompanying drawings, Figure 1 represents in side elevation a grading and ditching machine embodying the various features and principles of our invention. Fig. 2 is a section on line $x$ $x$ in Fig. 1. Fig. 3 is an enlargement of a portion of Fig. 2. Fig. 4 is a cross-section through the elevating-carrier on line $y$ $y$ in Fig. 3. Fig. 5 is a cross-section of the telescoping bar which connects the rear end of the plow with the body-frame, the section being on a larger scale and taken on line $x'$ $x'$ in Fig. 3. Fig. 6 is a cross-section, on a larger scale, of one of the carrier side beams, the section being taken on line $z$ $z$ in Fig. 3. Fig. 7 is a plan of the machine illustrated in Fig. 1, certain portions—such as the driver's seat, the upper part of the body-frame, and the hand-wheel shafts—not being shown. Fig. 8 is a section on line $y'$ $y'$ in Fig. 1, the outer portion of the elevating-carrier being shown partly raised in full lines and entirely raised in dotted lines. Fig. 9 is an enlarged view of the elevating-carrier, showing the frame-sections in the position shown in dotted lines in Fig. 8 and the outer or upper end of the carrier being broken away for convenience of illustration. Fig. 10 is a plan view of the inner frame-section and the adjacent portion of the outer frame-section of the elevating-carrier on the same scale as Fig. 9. Fig. 11 is a perspective of the body-frame. Fig. 12 is a perspective of the receiving end of the elevating-carrier. Fig. 13 is a longitudinal section through the hub of one of the rear driving-wheels and also through the ratchet device which connects the hub with the journal. Fig. 14 is a view of the inner end of the wheel-hub shown in Fig. 13. Fig. 15 is a side view of the ratchet-wheel shown in Fig. 13. Fig. 16 is a side view of the disk or plate which carries the pawls and which is arranged intermediate the hub and ratchet-wheel, as shown in Fig. 13.

As illustrated, the machine comprises in general a body-frame A, a plow B, arranged, preferably, at the left-hand side of the machine, and an elevating-carrier C, arranged to receive the soil from the plow and convey the same to the farther side of the machine, at which point it is then discharged either onto the ground or into a wagon traveling beneath the outer end of the carrier. The plow B can be of any ordinary or desired form, but is preferably provided with an extensible or longitudinally-adjustable plow-beam, with a view to enabling the driver to turn the machine sharply to the left, for in ditching the machine is preferably turned around to the left when brought to the end of the ditch, and while it is desirable to employ a plow-beam of some length, so as to steady the plow and keep its point in the ground, it is obvious that a beam of this character will not permit the machine to be turned sharply to the left, as in such case the draft appliances will be brought into collision with the forward portion of the beam before the team can be swung around to the necessary or desired extent. So that for the purpose of obviating this difficulty and thereby facilitating the operation of ditching, the plow-beam is preferably made extensible or longitudinally adjustable, whereby the forward portion may be retracted or adjusted rearward sufficiently to permit the team to be swung sharply to the left without danger of colliding with the forward end of the beam. As a simple and practical arrangement the plow-beam may consist of a rear portion $b$, suitably secured to the plow, and a forward portion $b'$, having an adjustable connection with the rear portion and preferably provided with a caster-wheel $b^2$. The two beam portions or sections may be connected for relative adjustment in any suitable manner—as, for instance, the front and rear beam-sections may, if so desired, be made of wood and channel-iron, respectively, and the former can be clamped within the channel of the latter by suitably-connected cheek-plates $b^3$, though it is obvious that various other arrangements may be adopted for this purpose without in any way departing from the object of our invention. In this manner, therefore, while the plow-beam may be comparatively short for ditching, the same beam may be comparatively long for all varieties of work other than ditching, and the necessity of changing or substituting one beam for another is of course by this arrangement avoided. The plow-beam may be provided with the usual colter-wheel $b^4$. The plow is preferably raised and lowered by a couple of hand-wheel shafts $b^5$ and $b^6$ through the medium of a couple of chains or cords $b^7$ and $b^8$, which serve to connect the two shafts, respectively, with the front and rear ends of the beam-section $b$, and whereby the plow may either be given a bodily vertical adjustment or be titled so as to throw its point into or out of the ground, and, further, the front and rear ends of the beam-section $b$ are preferably and respectively connected with the opposite side of the body-frame by draft and balance bars $b^9$ and $b^{10}$. (See Fig. 7.) The connection of the two bars with the body-frame is preferably such that the bars are capable of a limited extent of both vertical and horizontal swing and their outer ends may be hinged or pivotally connected with the plow-beam in any suitable or desired manner, the latter connection permitting the plow to be tilted sidewise about a horizontal and longitudinally-extending axis. A draft-chain $b^{11}$ or the like connects the draft-bar with the forward portion of the body-frame, and a turnbuckle $b^{12}$ permits the chain to be lengthened or shortened, according to requirements and the character of the work. Lateral adjustment of the plow is also desirable. To such end, therefore, the draft-bar $b^9$ is adjustably connected with the body-frame, so as to permit an end adjustment or longitudinal shift on the part of said bar, and the balance-bar $b^{10}$ is constructed with a telescoping or extensible joint $b^{13}$, which latter, in conjuction with the adjustable connection of the draft-bar with the frame, permits the plow to be adjusted laterally. The said extensible or telescoping joint may be of any form or construction; but as a simple and advantageous arrangement the joint is located at a point near the plow, so as to permit easy access thereto, and the telescoping ends of the two sections of the bar are provided with holes adapted to receive one or more locking-pins $b^{14}$. With this arrangement the balance-bar may easily be lengthened or shortened by simply removing the locking pin or pins and then adjusting the two bar-sections relatively and according to the extent of lateral adjustment desired for the plow, and the latter may then be locked in such position by reinserting the pin or pins, and thereby locking the two bar-sections against further relative shift. In the drawings the relatively long section of the balance-bar is illustrated as being made of T-iron and the relatively short section as being flat and having a couple of short lengths of angle-iron rivoted to its rear surface, the web or flange of the T-iron being received between the opposing surfaces of the two angle-irons in the manner shown in Fig. 5. This mode of construction tends to secure both lightness and strength; but it will be understood that we do not limit ourselves to any particular formation of bar or to any particular means for locking the two sections together and that other arrangements may be adopted, if so desired.

The body-frame A, from which both the plow and elevating-carrier are supported and which constitutes matter of further and special improvement, comprises, preferably, a couple of substantially parallel and longitudinally-arranged trusses, the same being suitably connected by cross-beams and supported at their end portions by front and rear vehicle-wheels. Referring to Figs. 1 and 11, it will be seen that the truss at the plow side of the machine is composed simply of an arch and a tie-rod, while the truss at the farther or carrier side is substantially what is known as a "queen-post" truss, for it will be observed that while the former truss comprises an arch $a$ and a tie-rod $a^2$ the latter comprises an arch $a'$, the tie rods or beams $a^5$, $a^6$, and $a^7$, and a couple of queen-posts $a^3$ and $a^4$. The said queen-posts are preferably extended upwardly to form a part of a sort of superstructure for supporting the various hand-wheel shafts, sheaves, &c., employed in raising and lowering the carrier, and the two trusses may be connected and braced in any suitable manner—as, for instance, by the cross-beams $a^{10}$, $a^{11}$, $a^{12}$, $a^{13}$, $a^{14}$, and $a^{15}$. The rear end portions of the trusses are secured to boxes 1, providing bearings for the journal 2, the drive-wheels D being mounted upon the latter, and the forward end portions of the trusses may be connected by a bolster $a^{16}$, adapted to rest upon the fifth-wheel. A push-bar $a^9$ is also preferably provided and suitably connected with the rear end portion of the body-frame and adapted at its rear end for connection with a pushing-tongue. It will also be observed that the forward portion of the arch $a'$ is strengthened by a small king-post truss $a^{17}$ and that the forward end portion of the tie-beam $a^5$ is turned over or bent to provide a hook or loop $a^8$, adapted to receive the end of the draft-bar $b^9$. A body-frame thus constructed is strong and light and peculiarly adapted to withstand the various strains and tensions incident to an operation of the machine or to a manipulation and adjustment of the plow and carrier.

The usual elevated driver's seat $a^{18}$ is provided at the forward end of the body-frame, and from the platform $a^{19}$ at the rear all adjusting devices are easily within reach of an attendant standing thereon.

Referring now more particularly to Figs. 2, 3, 8, and 9, it will be seen that the transversely-arranged elevating-carrier C, which receives the soil from the plow and conveys it to a point somewhat beyond the farther side of the body-frame, comprises an endless conveyer-belt $c$, arranged or supported upon rolls suitably mounted upon a carrier-frame, and that the carrier as a whole is adjustably supported or suspended from rotary hand-wheel shafts $c'$, $c^2$, and $c^3$ through the medium of chains $c^4$, $c^5$, and $c^6$. The roll $c^7$ at the inner or receiving end of the carrier is simply an idler roll, while the comparatively large roll $c^8$ at the outer or delivery end of the conveyer is a driving-roll, and for such purpose the latter is connected up with the journal 2 through the medium of power-transmitting mechanism comprising the sprockets $c^9$ and $c^{10}$, the sprocket-chain $c^{11}$, shaft $c^{12}$, bevel-gears $c^{13}$ and $c^{14}$, and preferably one or more clutches for controlling the operation of the conveyer-belt. The upper leaf of the endless conveyer-belt may be supported by a plurality of upper belt-rolls $c^{15}$, and its lower leaf can be sustained by a plurality of lower belt-rolls $c^{16}$, it being observed that the said upper and lower rolls are respectively journaled in boxes secured to the upper and lower surfaces of the parallel side beams $c^{17}$, which latter are embraced in the general construction of the carrier-frame. It will also be noted that the carrier-frame comprises a couple of frame-sections hinged together by an extensible joint and that as a simple and effective arrangement the latter may consist of a couple of bars $c^{18}$, having a sliding or telescoping connection with the inner or lower frame-sections and pivotal or hinge connection with the outer frame-section. (See particularly Fig. 9.) With this arrangement either frame-section may be swung about its pivotal point of connection $c^{19}$ with the other section, and in addition thereto the two sections may be either separated or brought together for the purpose of either tightening or slackening the conveyer-belt, and as a further advantage the provision of a telescoping or extensible joint for the two frame-sections permits the lower section to be swung bodily away from the plow for the purpose of clearing the machine of any rubbish which may accumulate between the plow and receiving end of the carrier. As a simple and efficient arrangement for so shifting the inner frame-section we provide a rock-shaft E, having crank-arms $e$ connected by pitmen $e'$ with the side beams of the inner frame-section, and provide also a hand-lever $e^2$ for rocking the said shaft, and thereby swinging the inner frame-section toward or away from the plow. The said hand-lever may be locked in its various positions by any suitable locking device—as, for instance, by providing the lever with a pin $e^3$, adapted to engage any one of a number of notches on the swinging bar $e^4$.

As a means for insuring a delivery of the soil from the moldboard of the plow to the conveyer-belt we provide the receiving end of the carrier with a guard F, adapted to prevent the soil from falling back upon the ground and also adapted and arranged to prevent the plow from striking and cutting the belt. Preferably the inner end of the carrier is also provided with a shoe $f$. The guard F may be bolted or riveted to the upper surface of the said shoe and may have its rear end curved or bent upward and secured to the side-board G substantially in the manner illustrated in Fig. 12. By such provision the soil is prevented from falling or sifting back upon the ground, as the guard is arranged to extend or project outwardly in such manner as to enable it to catch the soil falling between the plow and carrier and to in this way insure a delivery of the soil to the conveyer-belt, whether the machine be working in clay or sand or in wet or dry soil, and as a further advantage the guard serves to prevent the sharp edge of the moldboard from striking and cutting the belt. The guard may be constructed in various ways, but preferably consists of a piece of sheet metal cut and bent into the desired shape or form and secured to the shoe and side-board in any suitable or desired manner.

The outer frame-section of the carrier is preferably arranged to tilt about a horizontal axis, and such axis is preferably located at a point sufficiently distant from the body-frame to permit the said frame-section to be swung into a substantially vertical position. To this end the outer frame-section can be connected with or tied to the body-frame by a couple of swinging bars or arms $c^{20}$, it being observed that the inner ends of the latter are pivoted to the body-frame at $c^{21}$, while their outer ends are similarly connected with the sides of the outer frame-section, and by referring to Fig. 8 it will also be seen that the point $c^{22}$, at which the said arms are pivoted to the carrier-frame, provides an axis about which the outer frame-section may be readily swung or raised into the position shown in dotted lines, so as to permit the machine to pass through a narrow gateway. The supporting-chains $c^6$ are preferably connected with the bars $c^{18}$, by which arrangement it is obvious that the attendant can easily raise and lower or otherwise adjust the carrier without leaving the platform $a^{19}$, whereas in certain former constructions involving a couple of jointed frame-sections it has been necessary to adjust the two sections separately, and, moreover, to employ various tools for so doing. The outer frame-section is preferably capable of a side swing or lateral adjustment, and to such end one of the arms $c^{20}$, preferably the forward one, is adjustably connected with the body-frame, so as to permit the outer end of the outer frame-section to be swung from side to side or adjusted laterally for the purpose of bringing the two sections into alinement. As a simple and effective arrangement for so doing, the bolt or pin $c^{21}$, by which the forward arm $c^{20}$ is pivoted to the body-frame, can be extended through a slot $c^{23}$ in the latter, and such bolt or pin may then be connected with the body-frame by an eye-bolt $c^{24}$. (See Figs. 8 and 10.) With this arrangement a tightening or loosening of the nuts $c^{25}$ on the threaded end of the said eyebolt will operate, respectively, to swing the outer end of the outer frame-section rearward or forward, and to thereby bring the said outer frame-section into alinement with the inner frame-section should the two at any time be wrenched or thrown out of alinement to an extent to cause the chain $c^{11}$ to bind upon the sprockets $c^9$ and $c^{10}$ or to cause the conveyer-belt to shift to one side, for it is evident that a satisfactory running of the carrier mechanism requires that the two sprockets be kept in line and also that a condition of parallelism be maintained between the rolls $c^7$ and $c^8$. It is obvious, however, that various devices may be employed for thus bringing the two frame-sections into alinement, and for this reason we do not limit ourselves to any particular device for so doing. The jointed portion of the carrier-frame may be locked against upward movement in any suitable manner—as, for instance, by connecting the carrier-frame with the body-frame by means of one or more stay-rods $c^{26}$. Ordinarily, however, one rod will be sufficient, and its lower end can be pivoted to the outer frame-section, while its upper end may be adjustably connected with a portion of the body-frame. In Fig. 2 the rod is illustrated as working or sliding in a sleeve $c^{27}$, secured to the upper portion of the king-post $a^3$, and the said sleeve as being provided with suitable means for locking the rod and sleeve against relative shift. Such locking means may consist of any well-known device adapted for this purpose—as, for instance, a small cam adapted to bind the rod within the sleeve and operated by a hand-lever $c^{28}$. With this arrangement the carrier may be raised or lowered or otherwise adjusted and then locked against upward shift or movement on the part of its middle portion, the tension or pull of the sprocket-chain $c^{11}$ having at times a tendency to throw the jointed portion of the carrier upward, and it will be observed that such locking device, like the hand-wheels for adjusting the carrier, is within easy reach of an attendant standing on the rear platform.

Each frame-section of the carrier preferably comprises a couple of parallel and oppositely-arranged side beams $c^{17}$, and each beam preferably consists of suitably-connected upper and lower angle-irons $c^{29}$ and $c^{30}$. The upper angle-irons $c^{29}$ can be arranged somewhat nearer together than the lower angle-irons $c^{30}$, so as to bring the bearings of the upper belt-rolls $c^{15}$ beneath the upper leaf of the belt, and the upper and lower angle-irons of each beam may be connected by a thin web or strip of sheet metal $c^{31}$. Across the tops of the two beams thus constructed are arranged and secured a plurality of cross-bars $c^{32}$, the latter consisting, preferably, of suitable lengths of channel-iron having their end portions bent down and bolted or otherwise secured to the lower angle-irons. (See Figs. 4 and 6.) The standards or supports $c^{33}$, which support the side boards G, are preferably secured within the channels of the downwardly-bent end portions of the bars $c^{32}$, and with further reference to the extensible joint by which the two frame-sections are connected it will be seen that the bearings H, in which the bars $c^{18}$ slide, are also secured to the said downwardly-bent end portions of the cross-bars and that such bearings comprise the small rolls $h$, arranged between the plate $h'$ and the standard $c^{33}$ and mounted upon the bolts $h^2$. The rolls $c^{15}$, which support the upper leaf of the conveyer-belt, are journaled in boxes $c^{34}$, secured to the upper surfaces of the angle-irons $c^{29}$, and the rolls $c^{16}$, which sustain the lower leaf of the belt, are journaled in boxes $c^{35}$, secured to the lower surfaces of the angle-irons $c^{30}$. The carrier-frame thus constructed entirely of iron or steel combines a maximum of strength and rigidity with a minimum of weight and material and in combination with the belt and other adjuncts affords a highly-efficient and most satisfactory arrangement for disposing of the soil torn up by the plow.

As previously stated, the conveyer-belt is driven from the wheels D through the medium of suitable power-transmitting mechanism, and in Figs. 13, 14, 15, and 16 we have illustrated the construction of the hub of one of the said wheels and also the ratchet device by which such wheel is operatively connected with the journal 2. The said wheel is preferably constructed with a hub $d$, having lugs $d'$, and is provided with tangent spokes $d^2$, secured at their inner ends to the said lugs. The hub $d$ may be cast hollow, so as to provide a chamber $d^3$, in which a quantity of waste $d^4$, saturated with oil, may be placed for lubricating purposes, and with respect to the ratchet device I the inner end of the hub is preferably provided with radial recesses $d^5$. Referring to Fig. 13 it will be seen that the said ratchet device comprises a ratchet-wheel $i$, provided internally with ratchet-teeth $i'$, and a pawl plate or disk $i^2$, provided with pawls $i^3$, adapted to engage the teeth on the ratchet-wheel. It will also be observed that the pawl-plate is provided with lugs or projections $i^4$, adapted to engage the recesses or slots $d^5$ in the end of the wheel-hub, and that the hub, pawl-plate, and ratchet-wheel are fitted together in such manner as to effectually exclude all dust and dirt from the interior of the ratchet device. With this arrangement it is obvious that a forward movement of the machine will operate to rotate the journal 2, while in the case of a reverse movement or a turning around of the machine the pawls $i^3$ will simply slide backward over the ratchet-teeth $i'$, and thereby permit the wheels to turn without rotating the said journal, and it is with respect to such backward rotation of the wheel upon the journal that the provision of the lubricating-chamber $d^3$ is made, for it will be seen that at such time the friction between the hub and journal is considerable and that for this reason it is desirable to make some provision for constant lubrication. The arrangement is particularly advantageous, as it permits ready access to the interior of the ratchet device and for the further reason that it permits both a removal and replacement of the drive-wheels without the necessity of employing tools and without removing the ratchet devices, as the connections of the latter with the wheel-hubs are practically clutch connections.

What we claim as our invention is—

1. In a grading and ditching machine, a plow arranged at one side of the body-frame and provided with an extensible or longitudinally-adjustable plow-beam, whereby the distance between the forward end of the latter and the plow may be varied according to the character of the work, and a locking device adapted and applied for locking the plow-beam in its various adjustments.

2. In a grading and ditching machine, and in combination with the body-frame, front wheels and draft appliances, a plow arranged at one side of the machine and provided with an extensible or longitudinally-adjustable plow-beam which can be projected or retracted according to the character of the work.

3. In a grading and ditching machine, a plow arranged at the left-hand side of the body-frame and provided with an extensible or longitudinally-adjustable plow-beam, supported at its forward end by a caster-wheel, whereby the latter may be adjusted rearward for the purpose of permitting the machine to be turned around to the left.

4. In a grading and ditching machine, and in combination with the body-frame and transversely-arranged carrier, a plow positioned at one side of the said frame and arranged for a side delivery to the lower end of said carrier; the said plow being provided with a plow-beam supported at its forward end by a suitable caster-wheel, and the said beam being composed of two or more telescoping sections, whereby the said caster-wheel may be adjusted rearward substantially as and for the purpose described.

5. In a grading and ditching machine, a plow arranged at one side of the body-frame and provided with a plow-beam having a caster-wheel at its forward end; the said plow-beam being composed of a couple of telescoping sections consisting of a channel-iron and a beam adapted and arranged for longitudinal adjustment along the channel of said iron, and suitable clamping devices being provided for locking the said two sections against relative shift.

6. In a grading and ditching machine, a plow arranged at one side of the body-frame and provided with an extensible or longitudinally-adjustable plow-beam supported at its forward end by a caster-wheel; the said beam consisting of a couple of telescoping sections whereof the rear one is suitably secured to the plow and connected with the draft device, and means being provided for locking the two plow-beam sections against relative shift.

7. In a grading and ditching machine, a plow arranged at one side of the body-frame and provided with a plow-beam composed of a couple of telescoping sections; the forward section being provided with a suitable caster-wheel, and the other section being adjustably connected with the said plow and one or more clamping devices being provided for locking the said two sections against relative shift.

8. In a grading and ditching machine, the combination of a plow and a belt-carrier, the plow having a side delivery to the lower end of the said carrier, the said lower end of the latter being provided with a shoe, and a guard being rigidly secured to the latter; the said guard having a flat horizontal forward portion which is bolted or otherwise suitably secured to the shoe, and an upwardly-curved rear portion; the guard thus formed being arranged to project outwardly from the carrier, so as to prevent the plow from striking the belt, and also for the purpose of preventing the soil from falling back upon the ground.

9. In a grading and ditching machine, the combination of the plow and carrier, the lower end of the latter being provided with a shoe, and a guard arranged to prevent the plow striking the belt and also adapted to insure a delivery of the soil from the plow to the said belt; the said guard having a flat horizontal front portion which is suitably secured to the upper side of the carrier-shoe, and an upwardly-curved rear portion which is bolted or otherwise suitably secured to the carrier side-board.

10. In a grading and ditching machine, and in combination with the plow and carrier, the guard E rigidly secured to the carrier-shoe and side-board, substantially as and for the purpose described.

11. In a grading and ditching machine, a tangent-spoked driving-wheel having a hub cast hollow and provided externally with lugs to which the spokes are fastened; the recess or chamber provided by the hollow interior of the hub being adapted to contain waste saturated with oil, the waste being in contact with the journal; and suitable power-transmitting mechanism being provided for connecting the drive-wheel with the carrier, whereby a forward movement of the machine will operate to rotate the journal and drive the carrier, but whereby the drive-wheel may rotate freely upon the said journal when the machine is turned around or backed.

12. In a grading and ditching machine, a vehicle-wheel having a hollow hub, the interior of the latter being adapted to provide a chamber wherein a quantity of oil and waste may be placed for lubricating purposes, the waste being in contact with the journal or axle upon which the wheel is mounted.

13. In a grading and ditching machine, the drive-wheel D having a hub $d$ cast hollow and provided with the lugs $d'$, the interior of the hub being adapted to provide a waste-chamber $d^3$, and the waste $d^4$ contained in the latter being in contact with the axle or journal upon which the wheel is mounted.

14. In a grading and ditching machine, the combination of a drive-wheel a ratchet device, and power-transmitting mechanism between the latter and the elevating-carrier; the said ratchet device consisting of a ratchet-wheel and a disk or plate provided with one or more pawls adapted to engage the teeth of the ratchet-wheel, the inner end of the drive-wheel hub being provided with one or more recesses, and the adjacent side of the said disk or plate being provided with one or more lugs adapted to engage the said recess or recesses in the end of the said hub, whereby the latter and the said disk or plate will rotate in unison and whereby the drive-wheel may be connected with and disconnected from the ratchet device without the use of tools.

15. In a grading and ditching machine a rotary axle or journal from which the elevating-carrier is driven through the medium of a ratchet device which is mounted upon said journal or rotary axle, and a drive-wheel which is arranged upon the end portion of such axle or journal and which has the inner end of its hub clutch-connected with the said ratchet device, whereby the said wheel can be readily removed without removing the said ratchet device.

16. In a grading and ditching machine, a rotary axle or journal from which the elevating-carrier is driven through the medium of a ratchet device which is mounted upon the said journal or rotary axle, a drive-wheel arranged upon the outer end portion of said axle or journal, and a clutch device which is arranged intermediate of the wheel-hub and ratchet device, substantially as and for the purpose set forth.

17. In a grading and ditching machine, the combination of a drive-wheel, a ratchet-wheel, a disk or plate carrying one or more pawls and adapted to engage the inner end of the drive-wheel hub, an elevating-carrier, and power-transmitting mechanism arranged to connect the said ratchet-wheel with the said carrier.

18. In a grading and ditching machine, the combination of the tangent-spoked drive-wheel D, the pawl-disk $i^2$, the ratchet-wheel $i$, the journal 2, the carrier C, and clutch-controlled power-transmitting mechanism arranged to connect the said ratchet-wheel and carrier.

19. In a grading and ditching machine, a tangent-spoked drive-wheel having a hollow hub provided at its inner end with recesses adapted to receive projecting lugs on a ratchet device, a carrier, and power-transmitting mechanism arranged to connect the said ratchet device and carrier.

20. In a grading and ditching machine, an elevating-carrier comprising a couple of oppositely-arranged and parallel side beams connected to form a frame, the two beams being connected by the cross-bars $c^{32}$ which are secured to the upper surfaces of said beams and which have their end portions bent down and secured to the bottom portions of said beams, and each beam consisting of upper and lower angle-irons; the upper belt-rolls journaled in bearings secured to the upper angle-irons, the lower belt-rolls journaled in boxes secured to the lower angle-irons, the endless conveyer-belt having its upper leaf supported by the said upper belt-rolls and its lower leaf sustained by the said lower belt-rolls, and the said conveyer-belt being throughout its length of a width to extend over and cover the bearings of the said upper belt-rolls.

21. In a grading and ditching machine, the elevating-carrier comprising a couple of oppositely-arranged and parallel side beams connected to form a frame, each beam consisting of suitably-connected upper and lower angle-irons, the distance between the lower angle-irons being greater than the distance between the upper angle-irons, the upper belt-rolls journaled in bearings secured to the upper surfaces of the upper angle-irons, the lower belt-rolls journaled in boxes secured to the lower surfaces of the lower angle-irons, the endless conveyer-belt having its upper leaf supported by the upper belt-rolls and its lower leaf sustained by the lower belt-rolls, and the said conveyer-belt being throughout its length of a width to extend over and cover the upper angle-irons.

22. In a grading and ditching machine, the elevating-carrier comprising a couple of oppositely-arranged parallel side beams having inwardly-overhanging upper portions, the upper belt-rolls journaled in boxes secured to the upper portions of the beams, the lower belt-rolls journaled in boxes secured to the lower portions of the beams, a plurality of cross-bars secured to the top surfaces of the two beams and having their end portions bent down and secured to the bottom portions of the side beams, and the endless conveyer-belt having its upper leaf supported by the upper belt-rolls and its lower leaf sustained by the lower belt-rolls.

23. In a grading and ditching machine, the elevating-carrier comprising a couple of oppositely-arranged and parallel side beams, each beam consisting of suitably-connected upper and lower angle-irons, the upper belt-rolls, the lower belt-rolls, a plurality of cross-bars secured to the tops of the upper angle-irons and having their end portions bent down and secured to the lower angle-irons, and the endless conveyer-belt having its upper leaf supported by the upper belt-rolls and its lower leaf sustained by the lower belt-rolls.

24. In a grading and ditching machine, the elevating-carrier comprising a couple of oppositely-arranged parallel side beams, each beam consisting of suitably-connected upper and lower angle-irons, the distance between the lower angle-irons being greater than the distance between the upper angle-irons, the upper belt-rolls, the lower belt-rolls, a plurality of cross-bars secured to the tops of the upper angle-irons and having their end portions bent down and secured to the lower angle-irons, and the endless conveyer-belt having its upper leaf supported by the upper belt-rolls and its lower leaf sustained by the lower belt-rolls.

25. In a grading and ditching machine, the elevating-carrier comprising a couple of parallel and oppositely-arranged side beams, each beam consisting of upper and lower angle-irons having a continuous web connection, the distance between the lower angle-irons being greater than the distance between the upper angle-irons, the upper belt-rolls journaled in boxes secured on the tops of the upper angle-irons, the lower belt-rolls journaled in boxes secured to the bottoms of the lower angle-irons, a plurality of cross-bars secured on top of the upper angle-irons and having their end portions bent down and secured to the lower angle-irons, and the endless conveyer-belt having its upper leaf supported by the upper belt-rolls and its lower leaf sustained by the lower belt-rolls.

26. In a grading and ditching machine, the elevating-carrier comprising a couple of parallel and oppositely-arranged side beams, each beam being composed of upper and lower angle-irons having a continuous web connection, the distance between the lower angle-irons being greater than the distance between the upper angle-irons, the upper belt-rolls journaled in boxes secured to the upper angle-irons, the lower belt-rolls journaled in boxes secured to the lower angle-irons, a plurality of channel-irons arranged transversely upon the upper angle-irons and having their end portions bent down and secured to the lower angle-irons, the endless conveyer-belt having its upper leaf supported by the upper belt-rolls, and its lower leaf sustained by the lower belt-rolls, and a couple of side boards supported by standards or uprights secured to the downwardly-bent end portions of the channel-irons.

27. In a grading and ditching machine, and in combination with the conveyer-belt, the carrier-frame, comprising a couple of parallel and oppositely-arranged side beams $c^{17}$, each beam consisting of upper and lower angle-irons $c^{29}$ and $c^{30}$ connected by a web $c^{31}$, and a plurality of cross-bars $c^{32}$ secured on top of the upper angle-irons and having their end portions bent down and secured to the lower angle-irons, all constructed and organized substantially as and for the purpose described.

28. In a grading and ditching machine, the combination of the side beams $c^{17}$ consisting of angle-irons $c^{29}$ and $c^{30}$ connected by a web $c^{31}$, the cross-bars $c^{32}$ having their ends bent down and secured to the lower angle-irons, the upper belt-rolls $c^{15}$, the lower belt-rolls $c^{16}$, the side boards G, and the endless conveyer-belt C, all constructed and organized substantially as and for the purpose described.

29. In a grading and ditching machine, and in combination with a transversely-arranged elevating-carrier, a plow which is arranged for a side delivery to the lower end of said carrier, and a telescoping balance-bar having one end pivotally connected to the rear portion of the plow and its other end connected directly with the body-frame of the machine, the said telescoping bar constituting means whereby the plow may be adjusted laterally, substantially as described.

30. In a grading and ditching machine, and in combination with the plow having a side delivery to the transversely-arranged elevating-carrier, a couple of arches suitably connected to form a body-frame and upheld or supported at their end portions by front and rear vehicle-wheels, the arch at the carrier side of the machine being braced to form or provide a queen-post truss.

31. In a grading and ditching machine, and in combination with the plow and elevating-carrier, the two longitudinally-extending trusses connected to form a body-frame; the truss at the plow side of the machine consisting of an arch and tie-rod; the truss at other side consisting of an arch, one or more tie-rods, and a couple of uprights or queen-posts; the two trusses being upheld or supported at their end portions by front and rear vehicle-wheels, and the said carrier being arranged between the said queen-posts.

32. In a grading and ditching machine, and in combination with the plow and elevating-carrier, the arches $a$ and $a'$ connected to form a body-frame, the tie-rod $a^2$, the tie rods or beams $a^5$, $a^6$ and $a^7$, and the queen-posts $a^3$ and $a^4$, all constructed and organized substantially as and for the purpose described.

33. In a grading and ditching machine, and in combination with the plow and elevating-carrier, a couple of longitudinally-extending and oppositely-arranged trusses connected to form a body-frame, the truss at the carrier side of the machine consisting of an arch $a'$, tie rods or beams $a^5$, $a^6$ and $a^7$, and a couple of queen-posts $a^3$, $a^4$, substantially as and for the purpose described.

34. In a ditching and grading machine, and in combination with the plow and carrier, the arches $a$ and $a'$, the tie-rod $a^2$, the tie rods or beams $a^5$, $a^6$ and $a^7$, the queen-posts $a^3$ and $a^4$, the cross-beams $a^{14}$ and $a^{15}$, the brace-beams $a^{10}$ and $a^{11}$, and the brace-beams $a^{12}$ and $a^{13}$, all constructed and organized substantially as and for the purpose described.

35. In a grading and ditching machine, and in combination with the plow, draft-bar and elevating-carrier, the body-frame composed of a couple of suitably-connected trusses, the truss at the carrier side of the machine consisting of an arch $a'$, queen-posts $a^3$ and $a^4$, tie-rods $a^6$ and $a^7$, and the tie-beam $a^5$ having its forward end portion bent over to form a hook $a^8$, substantially as described.

36. In a grading and ditching machine, and in combination with the plow, draft-bar and elevating-carrier, the two substantially parallel and longitudinally-arranged trusses connected to form a body-frame, and comprising the arches $a$ and $a'$ having their forward ends supported upon a bolster $a^{16}$ and their rear ends supported upon journal-boxes, the tie-rod $a^2$, the tie rods or beams $a^5$, $a^6$, and $a^7$, the queen-posts $a^3$ and $a^4$, the cross-beams $a^{14}$ and $a^{15}$, the oblique brace-beams $a^{10}$, $a^{11}$, $a^{12}$ and $a^{13}$, and the hook $a^8$, all constructed and organized substantially as and for the purpose described.

37. In a grading and ditching machine, an elevating-carrier comprising a couple of frame-sections having a pivotal or hinge connection, and a couple of bars having their inner ends pivoted to the body-frame and their outer ends pivotally connected with the outer and upper frame-section.

38. In a ditching and grading machine, an elevating-carrier comprising a couple of pivotally-connected frame-sections, and a couple of vertically-swinging bars having their inner ends pivoted to the body-frame and their outer ends pivotally connected with the side beams of the outer and upper frame-section.

39. In a grading and ditching machine, and in combination with the plow, an elevating-carrier pivotally connected with the outer ends of a couple of vertically-swinging bars, the inner ends of the latter being pivoted to the body-frame.

40. In a grading and ditching machine, an elevating-carrier comprising a couple of frame-sections having a pivotal or hinge connection, and a couple of swinging bars having their inner ends pivoted to the body-frame and their outer ends pivoted to the outer or upper frame-section at points between the latter's outer end and its pivotal connection with the inner or lower frame-section.

41. In a grading and ditching machine, an elevating-carrier comprising a couple of frame-sections hinged together by an extensible joint, the outer or upper frame-section being arranged to tilt or swing about an axis located at a point between its two ends.

42. In a grading and ditching machine, an elevating-carrier comprising a couple of pivotally or hinge connected frame-sections, the outer or upper frame-section being constructed and arranged to tilt or swing about an axis located between its ends.

43. In a grading and ditching machine, an elevating-carrier comprising a couple of pivotally or hinge connected frame-sections, the outer or upper frame-section being constructed and arranged to tilt or swing about a substantially vertically adjustable axis located between its two ends.

44. In a grading and ditching machine, an elevating-carrier comprising a couple of frame-sections hinged together by an extensible joint, the outer and upper frame-section being constructed and arranged to swing or tilt about a substantially vertically adjustable axis located at a point between its outer end and its point of connection with the inner or lower frame-section.

45. In a grading and ditching machine, an elevating-carrier comprising a couple of frame-sections hinged together by an extensible joint, and a couple of swinging bars or rods having their inner ends pivoted to the body-frame and their outer ends pivoted to the outer frame-section at points between the latter's outer end and its point of connection with the inner and lower frame-section.

46. In a grading and ditching machine, an elevating-carrier comprising a couple of pivotally or hinge connected frame-sections, the outer frame-section being arranged to swing or tilt about an axis located at a point between its two ends, a hand-wheel shaft located above the said pivotal connection of the two frame-sections, and one or more chains or cords for connecting the hand-wheel shaft with the jointed portion of the carrier-frame.

47. In a grading and ditching machine, an elevating-carrier comprising a couple of frame-sections connected together by an extensible joint, a hand-wheel shaft from which the said jointed portion of the carrier is supported through the medium of chains or cords, and a couple of swinging bars having their inner ends pivoted to the body-frame and their outer ends pivoted to the outer frame-section.

48. In a grading and ditching machine, an elevating-carrier comprising a couple of frame-sections hinged together by an extensible or telescoping joint, a hand-wheel shaft from which the jointed portion of the carrier is supported through the medium of chains or cords, and a couple of swinging bars or rods having their inner ends pivoted to the body-frame and their outer ends pivoted to the side beams of the outer frame-section at points between the latter's outer end and its point of connection with the other frame-section.

49. In a grading and ditching machine, and in combination with the plow, an elevating-carrier comprising a couple of frame-sections connected by a couple of bars, the latter having a pivotal connection with the outer frame-section and a sliding connection with the other frame-section, a hand-wheel shaft having a chain or like connection with the said bars, and a couple of vertically-swinging bars having their inner ends pivoted to the body-frame and their outer ends pivoted to the side beams of the outer frame-section.

50. In a grading and ditching machine, an elevating-carrier comprising a couple of frame-sections hinged together by an extensible joint, the outer frame-sections being constructed and arranged to swing or tilt about an axis located between its ends, the said axis being adjustable in the arc of a circle, substantially as and for the purpose described.

51. In a grading and ditching machine, and in combination with the plow, an elevating-carrier comprising a plurality of pivotally-connected frame-sections, and two or more swinging arms, each having one end pivoted to the body-frame and its opposite end pivoted to the side of the carrier.

52. In a grading and ditching machine, and in combination with the plow, an elevating-carrier comprising a plurality of frame-sections hinged together by extensible or telescoping joints, and a pair of swinging arms each having one end pivoted to the body-frame and its opposite end pivoted to the side of the carrier.

53. In a grading and ditching machine, a jointed vertically-adjustable elevating-carrier, and a locking device adapted and arranged to lock the jointed portion of the carrier against upward movement.

54. In a grading and ditching machine, an elevating-carrier arranged for vertical adjustment and comprising two hinge-connected sections, one or more rods pivotally connected with the carrier-frame at a point or points adjacent to the latter's joint and having a sliding connection with the body-frame, and means for locking the rods against shift or movement relative to the body-frame.

55. In a grading and ditching machine, an elevating-carrier comprising a couple of pivotally-connected frame-sections, one or more rods pivotally connected with the carrier at a point or points adjacent to the pivotal connection of the two frame-sections, the said rod or rods having a sliding connection with the body-frame, and means being provided for locking the rods against shift or movement relative to the body-frame.

56. In a grading and ditching machine, an elevating-carrier comprising a couple of frame-sections hinged together by an extensible joint, and one or more rods having its or their lower end or ends pivotally secured to the outer frame-section and its or their upper portions adjustably connected with the body-frame, and means for locking the rod or rods, and thereby the carrier, against shift or movement relative to the body-frame.

57. In a grading and ditching machine, and in combination with the plow, an elevating-carrier comprising a couple of frame-sections hinged together by an extensible joint, a pair of swinging arms having their inner ends pivoted to the body-frame and their outer ends pivoted to the outer frame-section, one or more rods having a pivotal connection with the outer frame-section at a point coincident with the point of pivotal connection between the said frame-section and the said swinging arms, the said rod or rods having a shifting connection with the body-frame, and means being provided for locking the rod or rods against shift or movement relative to the body-frame.

58. In a ditching and grading machine, and in combination with the plow, an elevating-carrier having a jointed frame and supported from the body-frame through the medium of chains or the like, and a locking device adapted and arranged to lock the jointed portion of the carrier against upward movement.

59. In a grading and ditching machine, an elevating-carrier comprising a couple of pivotally-connected frame-sections, a rod having its lower end secured to the carrier at a point near the pivotal connection of the two sections and having its upper portion slidingly connected with the body-frame, and a cam for locking the rod against shift or movement relative to the body-frame.

60. In a grading and ditching machine, and in combination with the plow, an elevating-carrier comprising a couple of frame-sections hinged together by an extensible joint, a rock-shaft arranged transversely above the lower or inner frame-section, crank-arms on said rock-shaft, pitmen connecting the crank-arms with the said lower or inner frame-section, a hand-lever for rocking said rock-shaft for the purpose of shifting the lower frame-section toward or away from the plow, and means for locking the said lower frame-section against shift.

61. In a grading and ditching machine, and in combination with the plow, an elevating-carrier comprising a couple of frame-sections hinged together by an extensible joint, the carrier being supported from the body-frame through the medium of chains or the like, a rock-shaft arranged transversely above the lower frame-section, crank-arms on the rock-shaft, pitmen connecting the crank-arms with the lower or inner frame-section, a hand-lever for rocking the rock-shaft, and means for locking the said lever in its different positions.

62. In a grading and ditching machine, an elevating-carrier comprising a plurality of frame-sections hinged together by an extensible joint, the outer end of the carrier being adjustable laterally for the purpose of alinement.

63. In a grading and ditching machine, an elevating-carrier comprising a couple of frame-sections hinged together by an extensible joint, the outer section being adjustable laterally for the purpose of alinement.

64. In a grading and ditching machine, an elevating-carrier comprising a couple of frame-sections hinged together by an extensible joint, the said joint being also adapted to permit a relative lateral swing on the part of the two sections for the purpose of alinement.

65. In a grading and ditching machine, an elevating-carrier comprising a couple of frame-sections hinged together by an extensible joint, the outer frame-section having also an adjustable connection with the body-frame, whereby the delivery end of the said outer frame-section may be swung from side to side or adjusted laterally for the purpose of alinement.

66. In a grading and ditching machine, an elevating-carrier comprising a couple of frame-sections hinged together by an extensible joint, the outer frame-section being arranged to tilt or swing about a horizontal axis, and the said axis being angularly adjustable in a substantially horizontal plane for the purpose of alinement, substantially as described.

67. In a grading and ditching machine, an elevating-carrier comprising a couple of frame-sections hinged together by an extensible joint, the outer frame-section being tied to the body-frame by a couple of swinging arms, and one of said arms having an adjustable point of connection with the body-frame, whereby the delivery end of the outer frame-section may be swung from side to side or adjusted laterally for the purpose of alinement.

68. In a grading and ditching machine, and in combination with the plow, an elevating-carrier comprising a couple of frame-sections hinged together by an extensible joint, a couple of swinging arms each having an end pivoted to the body-frame and the other end pivoted to the side of the upper frame-section, and the forward arm having an adjustable point of connection with the body-frame, whereby the delivery end of the outer frame-section may be swung from side to side or adjusted laterally for the purpose of alinement.

69. In a grading and ditching machine, and in combination with the plow, an elevating-carrier comprising a couple of frame-sections hinged together by an extensible joint, a pair of swinging arms having their inner ends pivoted to the body-frame and their outer ends pivoted to the sides of the outer frame-section, the point of pivotal connection of the arms with the outer frame-section being located between the latter's outer end and its point of connection with the other frame-section, and the forward swinging arm being adjustably connected with the body-frame for the purpose of alinement.

70. In a grading and ditching machine, an elevating-carrier comprising a couple of frame-sections hinged together by an extensible joint, the outer section being also arranged to tilt or swing about a horizontal axis extending transversely through the said outer frame-section, and one end of said axis being adjustably connected with the body-frame, whereby the axis may be given an angular adjustment in a substantially horizontal plane for the purpose of alinement.

WILLIAM J. EDWARDS.
THOMAS J. GRAY.

Witnesses:
GEO. F. BRAWNER,
J. E. BROWN.